United States Patent [19]
Rohm

[11] Patent Number: 5,375,857
[45] Date of Patent: Dec. 27, 1994

[54] KEYLESS LOCKABLE HAMMER-DRILL CHUCK

[76] Inventor: Günter H. Rohm, Heinrich-Röhm-Strasse 50, 89567 Sontheim, Germany

[21] Appl. No.: 153,532

[22] Filed: Nov. 16, 1993

[30] Foreign Application Priority Data

Nov. 16, 1992 [DE] Germany .................. 4238461

[51] Int. Cl.⁵ .............................. B23B 31/12
[52] U.S. Cl. ..................... 279/62; 279/140; 279/902
[58] Field of Search .................. 279/60–65, 279/140, 902

[56] References Cited

U.S. PATENT DOCUMENTS

| | | | |
|---|---|---|---|
| 4,836,563 | 6/1989 | Rohm | 279/63 |
| 5,145,192 | 9/1992 | Rohm | 279/62 |
| 5,158,306 | 10/1992 | Rohm | 279/61 |
| 5,174,588 | 12/1992 | Reibetanz et al. | 279/62 |
| 5,236,206 | 8/1993 | Rohm | 279/63 |

FOREIGN PATENT DOCUMENTS

WO91/12914  9/1991  WIPO .

*Primary Examiner*—Steven C. Bishop
*Attorney, Agent, or Firm*—Herbert Dubno; Andrew Wilford

[57] ABSTRACT

A drill chuck has a body centered on and rotatable about an axis, a plurality of jaws radially displaceable on the body, and an adjustment ring rotatable but not axially displaceable on the body and having a screwthread engaging the jaws for radially displacing the jaws when the adjustment ring is rotated on the body. A locking sleeve rotatable on the body at most through a small acute angle is axially displaceable on the body between a freeing position and a locking position. The locking sleeve and adjustment ring are formed with axially interengageable teeth that mesh only in the locking position. A spring braced between the locking sleeve and the body urges the locking sleeve into the locking position. A holding ring limitedly axially displaceable on the body is axially engageable with the locking sleeve. A pair of angularly spaced abutments on one of the rings and a part on the other ring permit only limited relative angular movement of the rings between a pair of angularly offset positions. Coupling formations between the rings couple same together for axial movement of the locking sleeve into its freeing position on rotation of the holding ring on the adjustment ring into one of its positions and for opposite axial movement of the locking sleeve into its locking position on rotation of the holding ring on the holding ring into the other of its positions.

10 Claims, 3 Drawing Sheets

KEYLESS LOCKABLE HAMMER-DRILL CHUCK

FIELD OF THE INVENTION

The present invention relates to a drill chuck. More particularly this invention concerns a keyless hammer-drill chuck that can be locked once tightened on a tool.

BACKGROUND OF THE INVENTION

A drill chuck such as described in U.S. Pat. No. 4,836,563 for use with a tool having a shaft typically has a chuck body centered on and rotatable about an axis and an adjustment ring centered on the axis, rotatable about the axis on the chuck body, and axially fixed on the chuck body. The chuck body is formed with a plurality of angularly equispaced jaw-guide passages centered on respective jaw axes all lying on the surface of an imaginary cone centered on the axis. The adjustment ring is formed with a screwthread centered on the axis and exposed in the guide passages. Respective jaws displaceable in the passages along the respective axes are each formed with a row of teeth meshing with the screwthread so that relative rotation of the body and ring in one direction moves the jaws radially inward and axially forward and opposite relative rotation moves the jaws radially outward and axially rearward.

As described in commonly owned patent application Ser. No. 07/956,048 filed 2 Oct. 1992, now U.S. Pat. No. 5,236,206, such a chuck is often provided with a locking sleeve that is axially displaceable on the chuck body and engageable with teeth on the adjustment ring to limit its rotation. A spring urges the locking sleeve axially forward so its teeth mesh with those of the adjustment ring. A holding ring is limitedly rotatable on the body between a pair of angularly offset holding and freeing positions and is movable by a coupling ring so that in the freeing end position it pushes back the locking sleeve into a position out of mesh with the adjustment ring and in the holding end position it leaves the locking sleeve and adjustment ring in mesh.

To adjust such a clutch the holding ring is turned into the freeing position so that the locking sleeve is pushed back against the force of its spring and the adjustment ring is rotated.

PCT published application WO 91/12914 (based on German application P 40 05 757.7 filed 23 Feb. 1990 by W. Riebetanz et al), and also U.S. Pat. No. 5,174,588, describes such a system where the holding ring is outside of and freely rotatable relative to the locking sleeve which itself is not rotatable relative to the chuck body. The coupling is provided between the locking and holding rings and is constituted as an axially open cam recess formed in the locking sleeve and an axially projecting actuating lug formed on the holding ring. Thus in this arrangement the holding ring is only limitedly rotatable relative to the locking sleeve which in turn is non-rotatable on the chuck body.

The disadvantage of this structure is that when the chuck is operated keyless, that is wholly by hand without the use of a geared chuck key, it is necessary to grip the holding ring in one hand and the adjustment ring in the other hand to rotate them relative to each other. Such operation is fairly simple. When, however, the chuck is to be rotated by the drill motor to assist opening or closing of the jaws, it is necessary to hold the adjustment ring only, as the holding ring is going to rotate with the chuck body. This is somewhat tricky and can lead to injury to the user if he or she inadvertently grabs the holding ring also.

OBJECTS OF THE INVENTION

It is therefore an object of the present invention to provide an improved lockable drill chuck.

Another object is the provision of such an improved lockable drill chuck which overcomes the above-given disadvantages, that is which can easily be operated keyless, even when the drill motor is used to assist the opening or closing operation.

SUMMARY OF THE INVENTION

A drill chuck has according to the invention a body centered on and rotatable about an axis, a plurality of jaws radially displaceable on the body, and an adjustment ring rotatable but not axially displaceable on the body and having a screwthread engaging the jaws for radially displacing the jaws when the adjustment ring is rotated on the body. A locking sleeve rotatable on the body at most through a small acute angle is axially displaceable on the body between a freeing position and a locking position. The locking sleeve and adjustment ring are formed with axially interengageable teeth that mesh only in the locking position. A spring braced between the locking sleeve and the body urges the locking sleeve into the locking position. A holding ring limitedly axially displaceable on the body is axially engageable with the locking sleeve. A pair of angularly spaced abutments on one of the rings and a part on the other ring permit only limited relative angular movement of the rings between a pair of angularly offset positions. Coupling formations between the rings couple same together for axial movement of the locking sleeve into its freeing position on rotation of the holding ring on the adjustment ring into one of its positions and for opposite axial movement of the locking sleeve into its locking position on rotation of the holding ring on the holding ring into the other of its positions.

Thus in this arrangement the holding ring is uncoupled rotationally from the locking sleeve and instead is coupled with the adjustment ring. To open and close the chuck purely by hand it is therefore only necessary to grip the holding ring in one hand and rotate the locking sleeve with the other hand. If the drill's drive is to be used for such tightening or loosening, the user need merely grab and hold the holding ring and actuate the drive in the appropriate direction It is not necessary to remember whether to operate the holding ring or the adjustment ring. In fact according to this invention the adjustment sleeve and holding ring together cover generally the full length of the chuck, exposing the chuck body and the adjustment ring only at the chuck ends, so that there is no substantial possibility of misuse of the assembly.

According to another feature of the invention the coupling formations include a cam surface on the one ring having a low portion and a high portion axially offset axially rearwardly therefrom. The part of the other ring rides on the cam surface and engages the high part in the one position of the adjustment ring and the low part in the other position of the adjustment ring. Normally the cam surface has two such high portions angularly flanking the low portion and the cam surface is further formed with an axially backwardly open seat level with the high portions in which the part is retainingly engageable. The one ring, which according to the invention is the adjustment ring, is formed with an axially open pocket open toward and covered by the other ring and having axially spaced flanks forming the abutments.

The drill chuck wherein the body and locking sleeve are formed with abutments limiting relative axial rotation of the sleeve on the body. This can serve for automatic self-tightening of the chuck. Such structure is assisted with a torque spring urging the locking sleeve rotationally in one direction on the body. This spring urges the sleeve rotationally against the same direction the adjustment ring is rotated in to move the jaws radially together. Thus when the chuck is locked the spring is urging the locking sleeve and adjustment ring, whose teeth are meshed, in the tightening direction.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
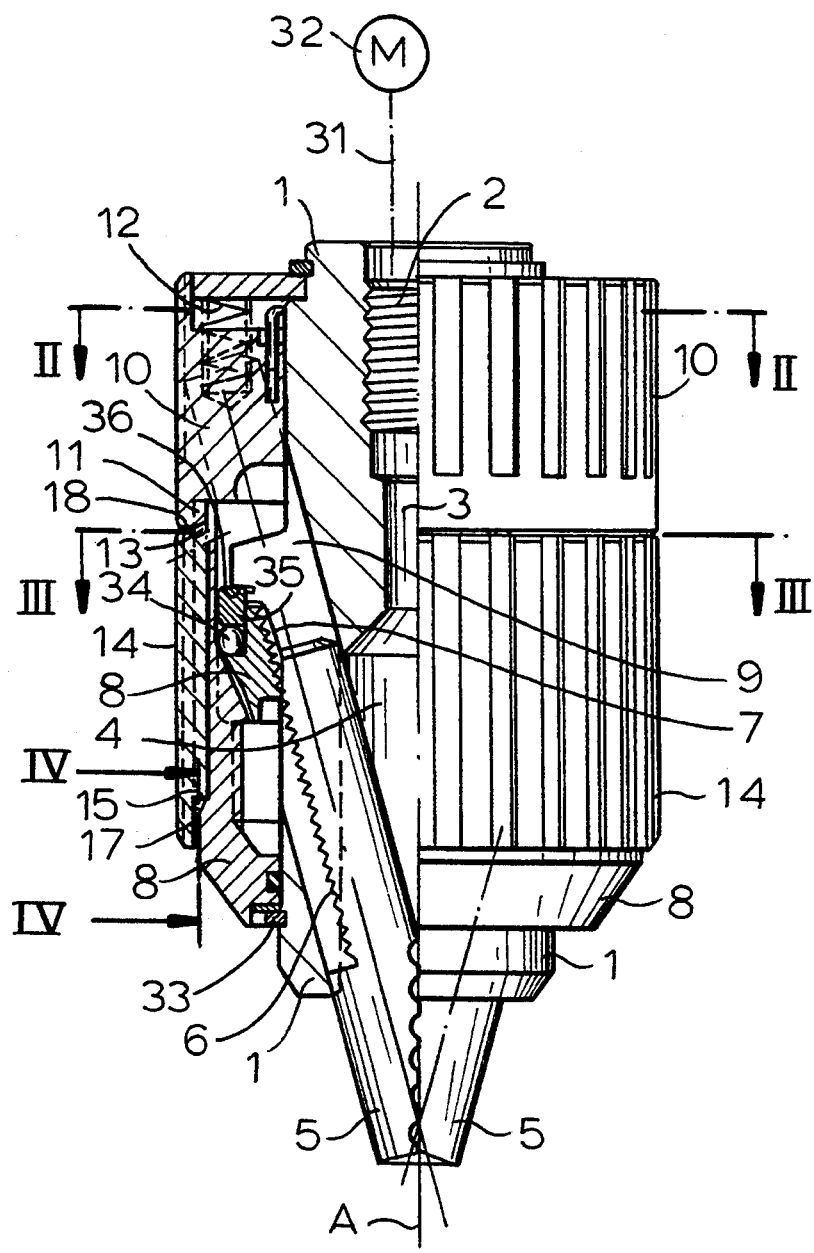
FIG. 1 is a side view partly in axial section through the chuck according to the invention.
Figure 2:
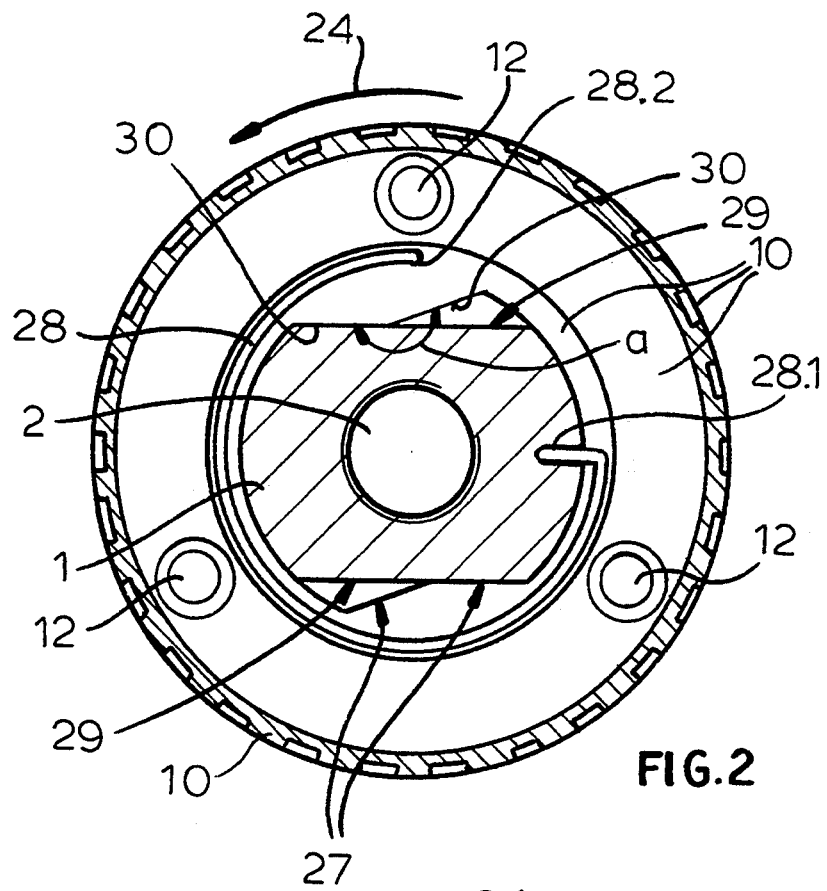
FIGS. 2 and 3 are sections taken along respective lines II—II and III—III of FIG. 1.

As seen in FIG. 1 a drill chuck according to this invention has a machined steel body 1 centered on an axis A and formed with an axially backwardly open threaded bore 2 normally fitted to the schematically illustrated threaded shaft 31 of a drive 32, an axially forwardly open recess or seat 4 adapted to receive an unillustrated bit, and a passage 3 axially interconnecting the bore 2 and seat 4 so that an unillustrated axially reciprocal hammer rod can strike the back of the tool for hammer drilling. The body 1 is formed with three angled and angularly equispaced guide passages 9 receiving respective slidable jaws 5 that can grip the unillustrated tool in the seat 4 to rotated it about the axis A. Teeth 6 formed on the radial outer edge of each jaw 5 mesh with a screwthread 7 formed on the inside of an adjustment ring 8 that is axially captured between a snap ring 33 set into the body 1 and a bearing 34 carried on a ring 35 braced against a forwardly directed shoulder 36 of the body 1, so that this ring 8 is rotatable but axially fixed on the body 1. Rotation of the adjustment ring 8 about the axis A in one direction on the body 1 therefore, as is well known in the art, moves the jaws 5 axially forward and radially inward to close the chuck on a tool or workpiece, and opposite rotation moves them oppositely to open the chuck.

Figure 3:
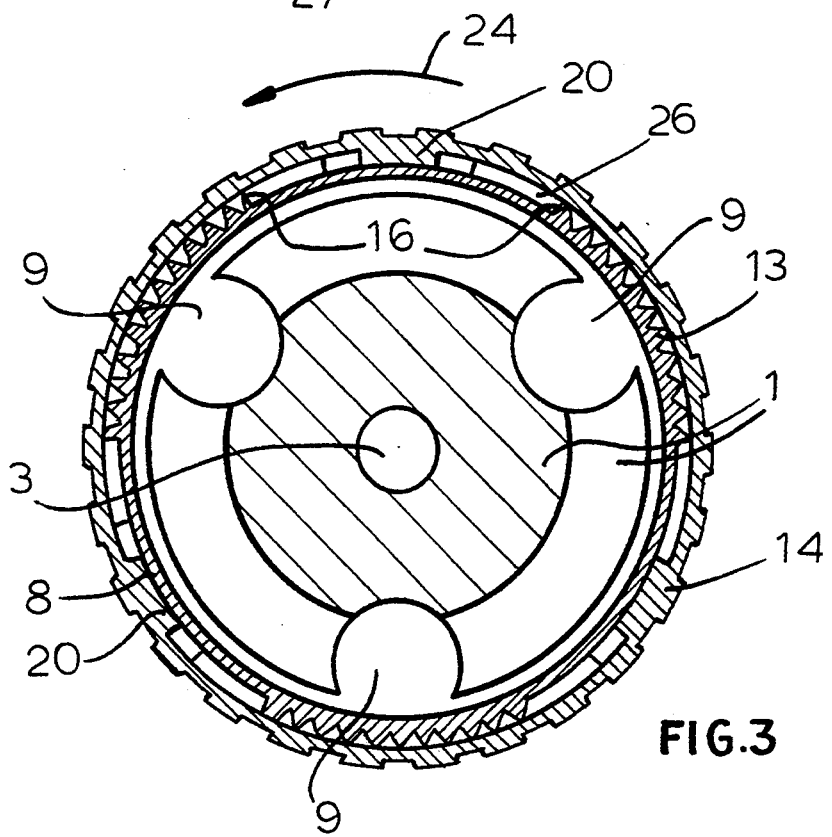

In order to avoid unwanted rotation of the adjustment ring 8, a locking sleeve 10 is provided with has a front edge formed internally with axially extending teeth 11 that can mesh with axially extending teeth 13 (see also FIG. 3) formed externally on the adjustment ring 8. The locking sleeve 10 is axially limitedly displaceable on the body 1 and is urged axially forward by springs 12 into a locking position preventing the adjustment ring 8 from relative to the locking sleeve 10. It is also limitedly angularly displaceable on the body 1 as described below.

In addition coaxially mounted on the chuck is a holding ring 14 having a front edge bearing on a rearwardly directed shoulder 17 of the adjustment ring 8 and a rear end braced against a forwardly directed edge or rim 18 of the locking sleeve 10. Abutments 16 shown in FIG. 4 angularly limit rotation of the holding ring 14 on the adjustment ring 8 but the holding ring 14 can rotate freely relative to the locking sleeve 10.

Figure 4:
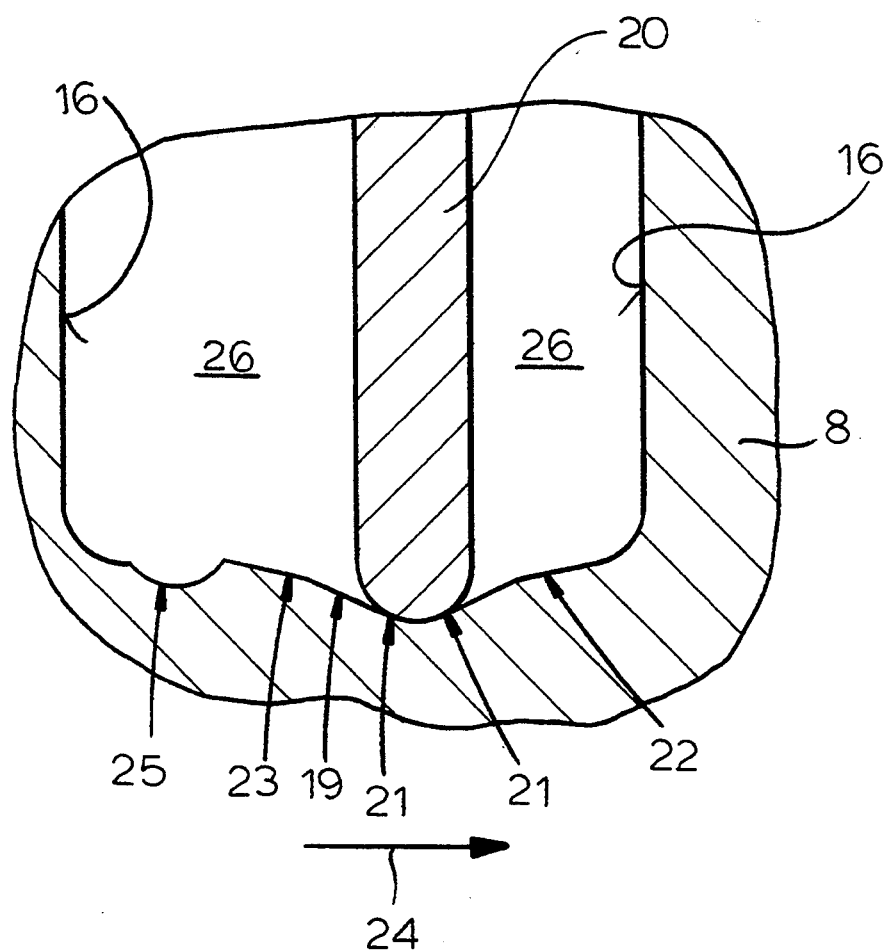
FIG. 4 is a large-scale sectional view taken along line IV—IV of FIG. 1.

A coupling 15 can move the holding ring 14 axially backward to push back the locking sleeve 10 and disengage its teeth 11 from the teeth 13 of the adjustment ring 8 in a freeing position. This coupling 15 is constituted as seen in FIG. 4 by three axially rearwardly open pockets 26 each having sides forming the rotation-limiting abutments 16 and a floor constituting a cam surface 19 having a central low point 21 flanked by two rising portions 22 and 23 on which can ride an axial front end of a respective follower rib 20 formed on the holding ring 14. When the ribs 20 are engaged in the low parts 21 the teeth 11 and 13 are meshed together and the adjustment ring 8 is rotationally locked to the locking sleeve 10, but when the ribs 20 are up on either of the higher flanking portions 22 and 23 these teeth 11 and 13 are out of mesh and the two parts 8 and 10 can rotate relative to each other. When the holding ring 14 is moved in a tightening direction 24 on the body 1 and held the chuck is unlocked, and when oppositely moved the ribs 20 can be seated in recesses 25 to hold it in the unlocked position. The holding ring 14 completely closes and protects the pockets 26 so that chips and the like produced by the tool in the chuck cannot clog them. Furthermore between them the locking sleeve 10 and holding ring 14 extend over almost the entire axial length of the chuck, so that very little of the adjustment ring 8 and chuck body 1 are actually exposed and the user can only rotate them as described below by manipulating these parts 10 and 14.

The locking sleeve 10 itself is only limitedly angularly movable on the body 1 with this angular travel limited by abutments 27. A torque spring 28 has one end seated in a hole 28.1 in the body 1 and an opposite end seated in a hole 28.2 in the locking sleeve 10 so as to urge the locking sleeve 10 in the direction 24 of closing or tightening of the chuck. The abutments 27 are formed by a pair of outwardly directed diametrically opposite chordal surfaces 29 formed on the body 1 and confronting angled chordal surfaces 30 on the locking sleeve 10, the latter each having two planar inwardly directed parts extending at an obtuse angle a to each other. The extent to which the angle a exceeds 180° is equal to the maximum angle through which the ring 20 can move during self-adjustment of the chuck. Thus the locking sleeve 10 can rotate limitedly on the body 1 in addition, as mentioned above, to being axially movable thereon.

The chuck described above is operated as follows:

Assuming the user wants to tighten the chuck, he need merely grab the holding ring 14 and rotate it in the forward direction 24. To start with this action will cause only the holding ring 14 to rotate on the adjustment ring 8 and body 1, bringing the follower ribs 20 out of the low points 21 and causing them to ride up on the flanks 22 until they strike the front abutments 16. As they do this, of course, the holding ring 14 is cammed axially backward to disengage the teeth 11 and 13 from each other. Once the teeth 11 and 13 are out of engagement, the spring 28 will move the locking sleeve 10 in the forward rotation direction 24, if possible, to its end position. Further forward rotation of the holding ring 14 will entrain the adjustment ring 8 by flat angular engagement of the ribs 20 with the front abutments 16. Once the chuck has been sufficiently tightened, the holding ring 14 is released so that the ribs 20 are seated again by the springs 12 in the low central regions 21 and the teeth 11 and 13 again mesh. In this position the spring 28 therefore is urging the locking sleeve 10 and the adjustment ring 8 connected to it in the tightening direction 24. During this operation rotation of the chuck body 1 can be prevented by gripping the locking sleeve 10 generally rotationally coupled to it, if the stationary machine shaft 31 is not enough to hold it still. Alternately the holding ring 14 can be held stationary manually while the drive 32 is actuated to tighten the chuck.

To loosen the chuck the holding ring 14 is oppositely rotated, normally seating the ribs in the seats 25. This action identically disengages the teeth 11 and 13 from each other and allows rotation of the holding ring 14 to be transmitted to the adjustment ring 8. The seats 25 allow the chuck to be latched when it is unlocked, making manipulation of it slightly easier and posing no danger as the holding ring 14 will invariably be turned in the opposite direction to unlatch it when a new tool is chucked and the chuck is tightened. For loosening also it is possible to do the job wholly manually by oppositely rotating the locking sleeve 10 and the holding ring 14, or with power assist by holding the holding ring 14 and actuating the drive 32 in the appropriate direction. Whether loosening or tightening the chuck, the user must grip and twist the holding ring.

In a self-tightening model the spring 28 can be dispensed with. Of course the screwthread 7 is of such a hand that in this situation the rotary action automatically moves the jaws 5 inward toward each other.

I claim:

1. A drill chuck comprising:
   a body centered on and rotatable about an axis;
   a plurality of jaws radially displaceable on the body;
   an adjustment ring rotatable but not axially displaceable on the body and having a screwthread engaging the jaws for radially displacing the jaws when the adjustment ring is rotated on the body;
   a locking sleeve rotatable on the body at most through a small acute angle and axially displaceable on the body between a freeing position and a locking position, the locking sleeve and adjustment ring being formed with axially interengageable teeth that are meshed in the locking position of the locking sleeve and that are out of engagement with each other in the freeing position of the locking sleeve;
   a spring braced between the locking sleeve and the body and urging the locking sleeve into the locking position;
   a holding ring limitedly axially displaceable on the body and axially engageable with the locking sleeve;
   means including a pair of angularly spaced abutments on one of the rings and a part on the other ring permitting only limited relative angular movement of the rings between a pair of angularly offset positions; and
   means including coupling formations between the rings coupling same together for axial movement of the locking sleeve into its freeing position on rotation of the holding ring on the adjustment ring into one of its positions and for opposite axial movement of the locking sleeve into its locking position on rotation of the holding ring on the holding ring into the other of its positions.

2. The drill chuck defined in claim 1 wherein the coupling formations include
   a cam surface on the one ring having a low portion and a high portion axially offset axially rearwardly therefrom, the part of the other ring riding on the cam surface and engaging the high part in the one position of the adjustment ring and the low part in the other position of the adjustment ring.

3. The drill chuck defined in claim 2 wherein the cam surface has two such high portions angularly flanking the low portion.

4. The drill chuck defined in claim 2 wherein the cam surface is further formed with an axially backwardly open seat level with the high portions in which the part is retainingly engageable.

5. The drill chuck defined in claim 1 wherein the one ring is formed with an axially open pocket open toward and covered by the other ring and having axially spaced flanks forming the abutments.

6. The drill chuck defined in claim 5 wherein the one ring is the adjustment ring.

7. The drill chuck defined in claim 1 wherein the locking sleeve and holding ring together extend generally a full axial length of the chuck.

8. The drill chuck defined in claim 1 wherein the body and locking sleeve are formed with abutments limiting relative axial rotation of the sleeve on the body.

9. The drill chuck defined in claim 1, further comprising
   a torque spring urging the locking sleeve rotationally in one direction on the body.

10. The drill chuck defined in claim 9 wherein the torque spring urges the sleeve rotationally in the same direction as the adjustment ring is rotated in to move the jaws radially together.

* * * * *